United States Patent
Seitz

(10) Patent No.: US 7,945,563 B2
(45) Date of Patent: May 17, 2011

(54) SEARCH EARLY WARNING

(75) Inventor: Edward F. Seitz, Atlanta, GA (US)

(73) Assignee: Yahoo! Inc., Sunnyvale, CA (US)

( * ) Notice: Subject to any disclaimer, the term of this patent is extended or adjusted under 35 U.S.C. 154(b) by 297 days.

(21) Appl. No.: 11/424,799

(22) Filed: Jun. 16, 2006

(65) Prior Publication Data
US 2007/0294203 A1   Dec. 20, 2007

(51) Int. Cl.
G06F 17/30   (2006.01)

(52) U.S. Cl. ........... 707/722; 707/706; 707/709; 726/22

(58) Field of Classification Search .............. 726/2, 22, 726/23, 24; 707/1, 100, 706, 709, 722; 715/200
See application file for complete search history.

(56) References Cited

U.S. PATENT DOCUMENTS

| | | | | |
|---|---|---|---|---|
| 6,356,899 | B1 * | 3/2002 | Chakrabarti et al. | 707/5 |
| 6,721,721 | B1 | 4/2004 | Bates et al. | |
| 7,031,968 | B2 * | 4/2006 | Kremer et al. | 707/100 |
| 7,043,757 | B2 | 5/2006 | Hoefelmeyer et al. | |
| 7,272,783 | B2 * | 9/2007 | Bauchot et al. | 707/102 |
| 2002/0138621 | A1 | 9/2002 | Rutherford et al. | |
| 2003/0097591 | A1 * | 5/2003 | Pham et al. | 713/201 |
| 2003/0187950 | A1 * | 10/2003 | Rising, III | 709/218 |
| 2006/0041927 | A1 * | 2/2006 | Stark et al. | 725/139 |
| 2006/0085741 | A1 * | 4/2006 | Weiner et al. | 715/517 |
| 2006/0101514 | A1 | 5/2006 | Milener et al. | |
| 2006/0129603 | A1 | 6/2006 | Park et al. | |
| 2007/0011739 | A1 * | 1/2007 | Zamir et al. | 726/22 |

OTHER PUBLICATIONS

Hallaraker,O, et al., "Detecting malicious JavaScript code in Mozilla" Proceedings of the 10th IEEE International Conference on Engineering of Complex Computer Systems (ICECCS 2005), Jun. 20, 2005.
Notification of Transmittal of The International Search Report And the Written Opinion of The International Searching authority, Or The Declaration (PCT/US2007/068703.
*Search Sites Tied To Viruses, Spyware* May 12, 2006, The Wall Street Journal—Online; p. 1-2 http://online.wsj.com/article_print/SB114739560986950892.html.
Ollmann, G.: "HTML Code Injection and effect of CSS (XSS) Vulnerabilities"Internet Publication, [Online] 2003 http://www.technicalinfo.net/papers/CSS.html—retrieved on Dec. 2, 2008.
Cross Site Scripting (XSS): "The Complete Documentation" [Online] XP002506390, 2008.
Supplementary European Search Report (EP 07 78 3611) dated Dec. 2, 2008.

* cited by examiner

Primary Examiner — Mohammad Ali
Assistant Examiner — Thuy (Tiffany) Bui
(74) Attorney, Agent, or Firm — James J. DeCarlo; Greenberg Traurig, LLP

(57) ABSTRACT

Systems and methods for automatically delivering information to a user concerning the embedded code contained in a web page before the user downloads the web page are disclosed. A search engine, in addition to performing a standard subject matter word search requested by a user, searches each web page to be listed to the user as part of the search results for information indicating that there is embedded code in the web page. If it is determined that a web page contains embedded code, the search results graphical user interface is provided with additional information indicating to the user which web page in the results contains embedded code. The user may also be alerted if a web page contains embedded code known to be malicious and the order of the search results may be modified based on the embedded code information of the web pages in the results.

27 Claims, 5 Drawing Sheets

SEARCH EARLY WARNING

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND OF THE INVENTION

Web pages often include more that formatted text. It is now common to include commands in web pages that cause the execution of scripts or other types of code on a computer viewing the web page. This is often referred to as "embedding" code or software in a web page in that, even though the actual code does not exist within the web page, the commands in the web page cause the code to be executed as part of the viewing process or in response to some user action. ActiveX, Flash, Shockwave, Javascript and style sheets are all examples of different types of embedded code that may be automatically executed on a computer when a web page is viewed.

Because the embedded code is executed on the viewing computer, these executables are often used by miscreants to gain access to other's computer for nefarious purposes. For example, an ActiveX control may be used to install a dialer, spyware, or a Trojan horse on a computer without the computer user's knowledge when the computer views a web page. Without inspecting the source code of a web page (e.g., the HTML code that makes up the page), a viewer normally will know what embedded code will be executed upon viewing the web page. In addition, simply by looking at the source code, a user often can not determine if an item of embedded code is malicious or not.

SUMMARY OF THE INVENTION

Against this backdrop the present invention has been developed. The present invention relates to systems and methods for automatically delivering information to a user concerning the embedded code contained in a web page before the user downloads the web page for viewing. In an embodiment, a search engine, in addition to performing a standard subject matter word search requested by a user, searches a previously generated index of web pages or each web page to be listed to the user as part of the search results for information indicating that there is embedded code in the web page. If it is determined that a web page contains embedded code, the search results graphical user interface is provided with additional information indicating to the user which web page in the results contains embedded code. The user may also be alerted if a web page contains embedded code known to be malicious and the order of the search results may be modified based on the embedded code information of the web pages in the results.

In one aspect, the present invention may be considered a method for searching content items such as web pages on a network. The method includes receiving a search request and identifying one or more web pages matching criteria contained in the search request. Search results are then generated and transmitted in response to the search request. The search results contain information identifying the one or more web pages matching the criteria contained in the search request and, for each of the one or more web pages containing embedded code, information derived from the embedded code.

In another aspect, the present invention may be considered a system for searching a network for digital information including a search engine adapted to search for web pages matching user-provided search criteria and to generate a listing of web pages matching the user-provided search criteria. The search engine is further adapted to search each web page matching the user-provided search criteria for text indicating that the web page contains embedded code. In addition, the search engine is further adapted to indicate on the listing that a web page contains embedded code. The system may also include a database in communication with the search engine that identifies at least one embedded code as malicious.

In yet another aspect, the present invention may be considered a graphical user interface generated by a search engine and displayed to a search requester. The graphical user interface includes a listing of items matching search criteria provided by a search requestor and, associated with each item, an embedded code information area containing information describing embedded code contained in the associated item.

These and various other features as well as advantages which characterize the present invention will be apparent from a reading of the following detailed description and a review of the associated drawings. Additional features of the invention are set forth in the description which follows, and in part will be apparent from the description, or may be learned by practice of the invention. The benefits and features of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWING

The following drawing figures, which form a part of this application, are illustrative of embodiments of the present invention and are not meant to limit the scope of the invention in any manner, which scope shall be based on the claims appended hereto.

DETAILED DESCRIPTION

Figure 1:
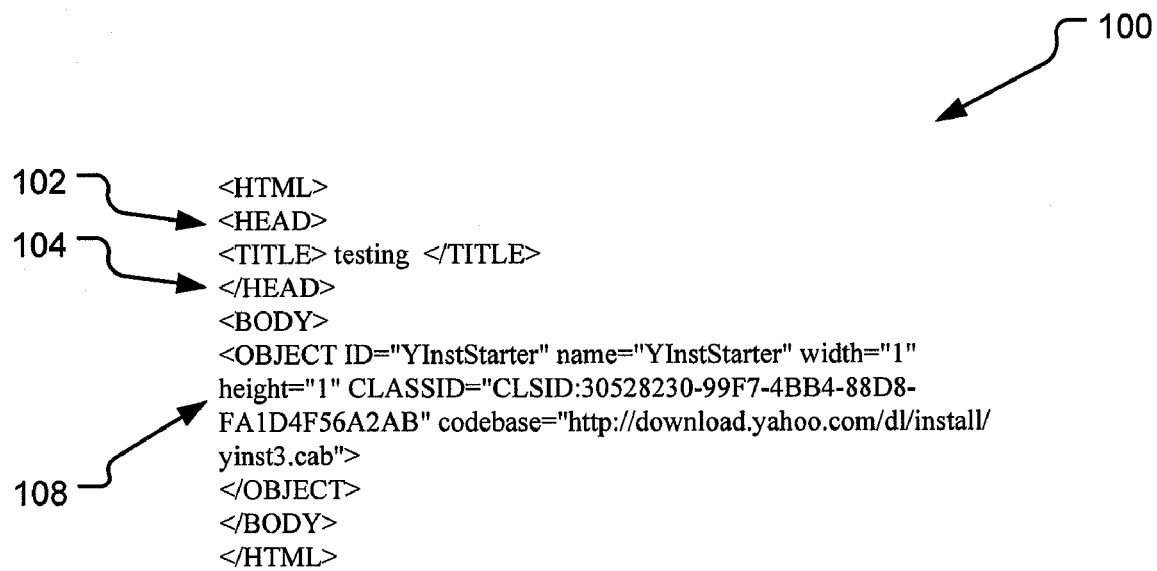
FIG. 1 is an example of the source code of a web page with an ActiveX control.

FIG. 1 is an example of the source code of a web page with an ActiveX control. The source code 100 includes a title 102 and a body 104 containing text. In addition, the source code 100 includes an embedded code identifier element 108 identifying an item of embedded code. In the embodiment shown, the HTML element "OBJECT" is used to identify the items of embedded code, "yinst3.cab", in this case an ActiveX control. The HTML language includes many different means for embedding code in a web page, e.g., the APPLET element, the OBJECT element shown, and the EMBED, IMG, and IFRAME element to name only a few.

Other languages have similar embedded code identifier elements. For example, in Javascript the statement, "var obj=new ActiveXObject(progID);" is an example of a creation in Javascript that embeds code in the page. As another example, the statement "Set swobject=CreateObject("ShockwaveFlash.ShockwaveFlash.8")" is an example of a creation of an ActiveX control in VBScript using Friendly Name.

In addition to the statements typically found in the body described above, another way of embedding code is to use a "style sheet" such as those designated by the STYLE element. While style sheets normally control the way text and graphics are presented on a page, embedded code may be contained in or pointed to by the style sheet.

Depending on the programming language used, there are many different ways to embed code into a web page. In addition to those described above, languages used for web pages may have other capabilities or means for embedding code. Embedding code in a web page is well known in the art.

In FIG. 1, the embedded code identifier element 108 includes all the information necessary for the computer that is rendering the web page 100 to identify, find, download and execute the embedded code "yinst3.cab". In the OBJECT element 108 shown, a Uniform Resource Locator (URL) is provided that identifies the network location from which the file "yinst3.cab" may be obtained.

In addition to the location, embedded code identifier elements often also provide some identifier of the embedded code. For example, in the case of ActiveX controls, the identifier may be a class ID (as shown in the second embedded code identifier 108) associated with the ActiveX control or a "friendly name" of the ActiveX control. The type of identifier provided may differ depending on the embedded code identifier element used and may differ based on preferences of the web page designer. It should also be noted that miscreants attempting to compromise a computer's security using embedded code often will do their best to obfuscate the identification of the embedded code by supplying misinformation in the identifier if possible.

Regardless, the existence of embedded code can be determined by a simple inspection of the source code of a web page. In addition, the type and nature and often an identifier of that embedded code may also be determined.

Figure 2:
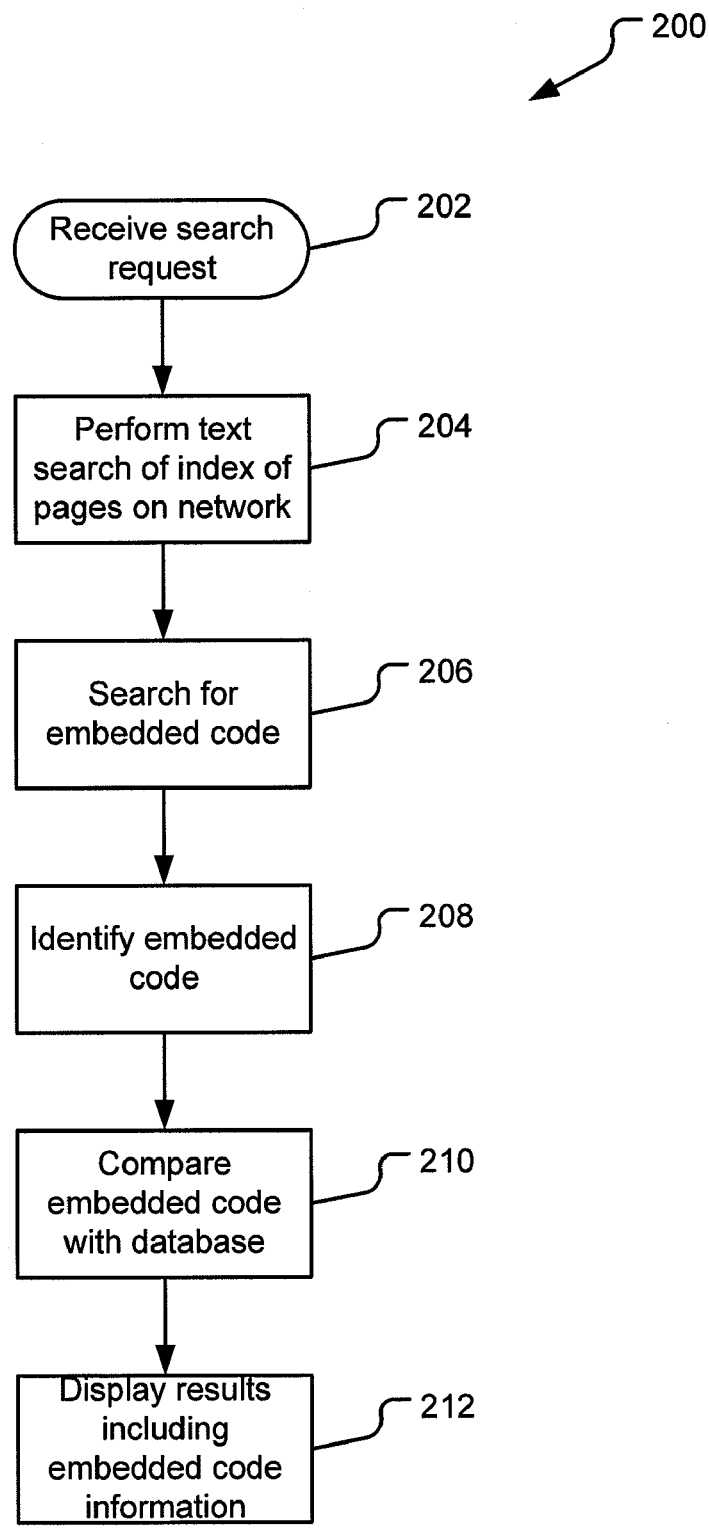
FIG. 2 illustrates an embodiment of a method of screening web pages for potential embedded code and displaying this information to a user as part of a search result.

FIG. 2 illustrates an embodiment of a method of screening web pages for potential embedded code and displaying this information to a user as part of a search result.

In the embodiment shown, the method 200 starts with a user initiating a search by accessing a search engine and entering a search request, such as for example a search request for pages associated with the word "baseball" in a receive search request operation 202.

The search engine may then perform a search of the network for all web pages matching the search criteria, i.e., baseball, in a text search operation 204. In an embodiment, this text search 204 typically includes searching a previously generated index of web pages on the network. Alternatively, it could involve searching the network itself. Often, such searches involve and inspection of the text in the web pages to return a set of results.

In the embodiment shown, each of the web pages that are included in the set of results are also searched for embedded code identifier elements in an embedded code search operation 206. In an embodiment the text search operation 204 and the embedded code search operation 206 may be performed serially. Alternatively, the text search operation 204 and the embedded code search operation 206 may be performed as part of a single, integrated search operation.

The embedded code search operation 206 searches each web page for indications that code has been embedded in the web page. This may include scanning or otherwise searching for any known embedded code identifier elements in the source code of the web page. For example, the system may scan pages for markers of embedded applets, ActiveX controls, plugins, Javascript, etc. It may also include searching for executable code actually contained in the source of the web page. In an embodiment, if viewing of the web page would result in any software being executed on a viewing computer other than that necessary to display text on the browser window, that software will be identified by the search engine in the embedded code search operation 206.

For the purposes of this specification, a web page that when viewed could cause the download and/or execution of software by the viewing computer is referred to as a web page that "contains embedded code". The reader will understand that such embedded software may only be referred to by the web page source code and does not actually exist within the web page source code.

The search operation 206 may further include virtually rendering the web page in addition to simply scanning the web page for embedded code identifiers. By virtually rendering the web page, some objects that are surreptitiously embedded through a dummy file that under normal circumstances would not be considered a potential source of embedded code, such as an image file or audio file, may be detected.

If the embedded code search operation 206 determines that a web page contains embedded code, the information provided in the web page about that embedded code is inspected. For example, the EMBED element in HTML includes a CLASS attribute that may include information about the embedded code. Other means of embedding code in web pages similarly provide at least some information, be it a name, an identifier, a location (such as a URL address), a publisher, etc. Regardless, this information about the embedded code is inspected and may be retrieved in an identify embedded code operation 208.

The identify embedded code operation 208 may also include categorizing the information in order to determine the proper order for listing the web pages in the search results by the embedded code detected on each page.

In the embodiment shown, the embedded code search operation 206 and the identify embedded code operation 208 are performed on the web pages listed in the results of the text search operation 204. However, in another embodiment, the embedded code search operation 206 may also or alternatively include searching the previously generated index for embedded code information, such as a flag, identifier, or embedded code information of some kind, that was generated at the time the index or index entries were created by the search engine.

For example, many modern search engines use a web crawler to continuously crawl the Internet and create an index or other database of web pages. In an embodiment, as each web page is encountered and indexed, the embedded code search operation 206 and the identify embedded code operation 208 are performed and information regarding the embedded software added to the search index to facilitate future searches. Thus, when the search request is received, all that is necessary is to perform the requested search operation 204 of the index and display the results, the embedded code information for each page being previously identified and categorized and thus easily displayed to the user as part of the results display.

After the identify embedded code operation 208, the information about each embedded code in the web page may be compared to a database of known embedded software in a comparison operation 210. The comparison operation 210 may include matching the information known about the embedded code with known embedded software to determine if the embedded software is legitimate or nefarious. The database has been previously developed and may include all embedded code identified by the search engine in previous searches. As embedded elements are determined to be nefarious, the database may be updated to reflect this new information. In addition, embedded code may be known to be legitimate based on a registration of that embedded code by the code's creator or the web page's creator. This allows creators of legitimate embedded code to make certain that users do not mistake their code for malicious code.

The comparison operation 210 identifies whether the embedded code is known to the database and whether the code is known to be legitimate or malicious based on the information in the database.

Next, the search results are displayed to the user requesting the search in a display results operation 212. The display results operation 212 may include generating a graphical user interface (GUI) containing a listing of web pages or other search results based on the requested search and transmitting the GUI to the user in response to the user's search request. The GUI is then displayed on the user's computing device. For example, the GUI may be dynamic .HTML page generated by the search system and transmitted to a browser on the user's computing device.

Figure 3A:
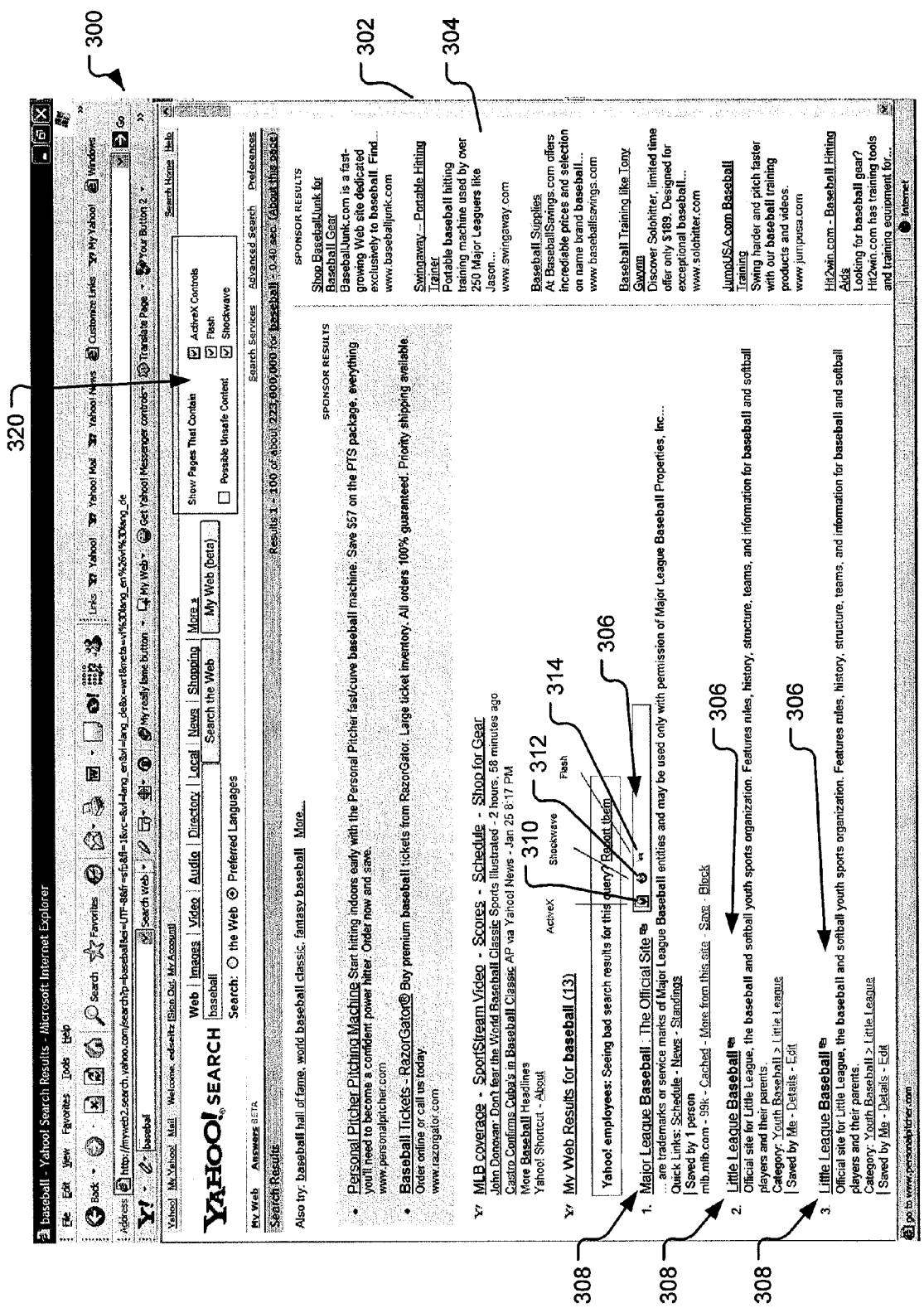
FIGS. 3A and 3B illustrate an embodiment of a graphical user interface displaying warnings concerning embedded code in web pages.
Figure 3B:
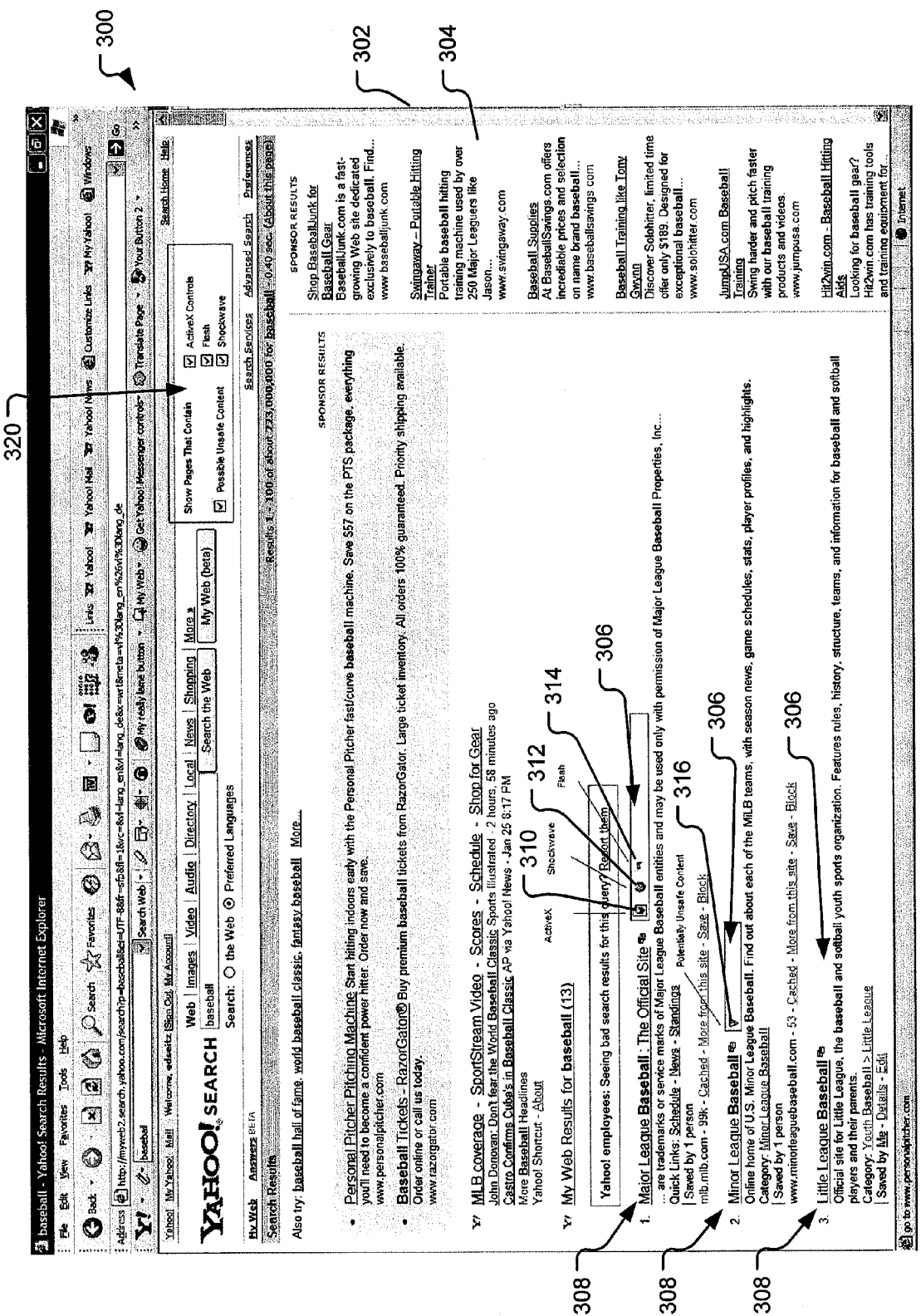

In an embodiment, the web pages matching the search criteria provided by the user are displayed, such in a list of links to each page (see FIGS. 3A and 3B). The display results operation 212 may display additional text describing the web page contents, for example taken directly from the text of the web page's source code.

The display results operation 212 also includes displaying to the user information regarding the existence of the embedded code on web pages listed in the search results. In a simple embodiment, the information displayed may be an indicator that a web page contains embedded code. In another embodiment, the information displayed may indicate what type(s) of embedded code is contained in each web page (i.e., ActiveX controls, Flash, Shockwave, Javascripts, etc.). In yet another embodiment, the information displayed may include an indicator of the results of the comparison operation 210 (i.e., the web page contains malicious code, registered/known legitimate code, or unknown code).

Based on the information displayed, the user that requested the search now has information concerning the embedded code contained in each web page in the search results listing. This allows the user to make an informed decision about whether to access each web page and what potential embedded code may be executed as a result of such access.

In addition to the utility in identifying known malicious code to the user, the existence of embedded code also provides an indication of how long it will take to display a given web page as the installation and execution of most embedded code is a time consuming process.

Alternative embodiments of the method 200 are also possible. For example, the order of the operations may be changed while still providing the same information to a user with the search results. In an embodiment, the search text operation 204 and the search for embedded code operation 206 may be performed periodically (or continuously) as part of a general search of content on the network rather than in response to receipt of a specific search request. The information obtained may then be stored, such as in an index, in a database and that database is then consulted upon the occurrence of a receive search request operation 202.

In yet another embodiment, the search for embedded code operation 206 may be performed periodically (or continuously) as part of a general search of content on the network independently of any text search. The URL or other identifier of any web pages or content items that are found to contain malicious or embedded code may then be added to a database that is consulted whenever search results are being generated. Other information about the embedded code may also be added to the database such as an identifier of the embedded code, the type of embedded code, whether the embedded code is known to be malicious or not and the URL of the embedded code. Then, as part of performing a search and generating a set of search results to be displayed to a user, the items listed in the search results are cross indexed with the database in a comparison operation to determine if any of the items in the search results have been previously determined to contain embedded code or malicious software. This embodiment may be particularly useful if information concerning embedded code or malicious web pages are provided by sources other than the search engine, e.g., members of the community or a security organization for instance.

FIGS. 3A and 3B illustrate an embodiment of a graphical user interface displaying warnings concerning embedded code in web pages. In the embodiment shown, the graphical user interface 300 is contained in a page 304 displayed by a browser in a browser window 302 rendered on a display device such as a monitor. The page 304 includes a listing 306 of web pages matching the search criteria baseball.

In the embodiment shown, the embedded code information about each web page in the listing 304 is displayed in an embedded code information area 306. Each web page entry 308 in the listing 304 includes an embedded code information area 306 associated with the web page. The embedded code information area 306 may include icons (as shown), textual or other indicators that convey to the user information concerning the embedded code on the associated web page.

The type and amount of embedded code information displayed are limited only by the search engine designer's preferences. More or less information may be displayed based on the search engine's ability to retrieve such information and space available or selected for such display. For example, in the embodiment shown, icons 310, 312, 314, 316 are used that indicate in a very little space the existence and the type of embedded code in an associated web page. Each icon 310, 312, 314, 316 provides different information to the user. In the embodiment shown, a first icon 310 indicates to the user than an ActiveX control is embedded in the associated web page; a second icon 312 indicates that a Shockwave item is embedded in the web page; a third icon 314 indicates that a Flash item is embedded in the web page; and a fourth icon 316 indicating unsafe embedded code (e.g., the embedded code was identified in a comparison operation 210 as being a known malicious code).

Such icons 310, 312, 314, 316 may indicate to the user what embedded code will automatically be executed by the user's computer if the page is accessed. Alternatively, such icons 310, 312, 314 may indicate to the user what embedded code could potentially be executed by the user's computer if the web page is accessed, e.g., assuming that every part or functionality of the web page is accessed thereby triggering execution of embedded code that may not be automatically executed upon display of the web page.

The embodiment shown in FIGS. 3A and 3B utilizes icons to convey information to the user. The reader will recognize that there are other ways to indicate the same information include via text, checkmarks in table entries, colors, etc.

In addition, as discussed above, the graphical user interface 300 may be modified to display more or less information as desired. For example, after each icon 310, 312, 314, 316 a number may be provided to indicate the number of different items of embedded code contained in the web page. This information may also be helpful to some users in determining relatively how long it may take to download a particular web page in the listing 304.

An embodiment of the present invention further allows users to select preferences on how search results are presented to the user based on the embedded code in the web page entries 308. In the embodiment of the graphical user interface 300 shown, a preferences selection area 320 is provided through which the user may select, via checkbox interface elements, what web pages are to be displayed. For example, a user may indicate through the selection of preferences that all web pages with embedded code of a specific type be removed from the listing 304 of moved to the end of the listing.

As another example, a user may indicate through the selection of preferences that all web pages with embedded code known to be malicious are not listed in the results of a search. FIGS. 3A and 3B show this scenario. FIG. 3A illustrates the listing 304 displayed when the user has selected, in the preferences selection area 320, that web pages with "unsafe content" are not be displayed. FIG. 3B illustrates the listing 304 for the same search when the user has selected, in the preferences selection area 320, that web pages with "unsafe content" are to be displayed in the listing 304. This provides an added level of security to users in addition to that installed on their computers by allowing users to be alerted to unsafe content even before accessing a web page and triggering the embedded code.

In addition, preferences may be provided that sort the entries 308 in the listing 304 based on the type and/or amount of embedded code in each web page of the search results. Such sorting may be controlled through a user's preference selections so that a user may modify how results are presented based on embedded code. These preferences may be controlled via the preferences selection area 320 or alternatively via a preference menu (not shown) accessible through a drop down box or some other display means known in the art.

Figure 4:
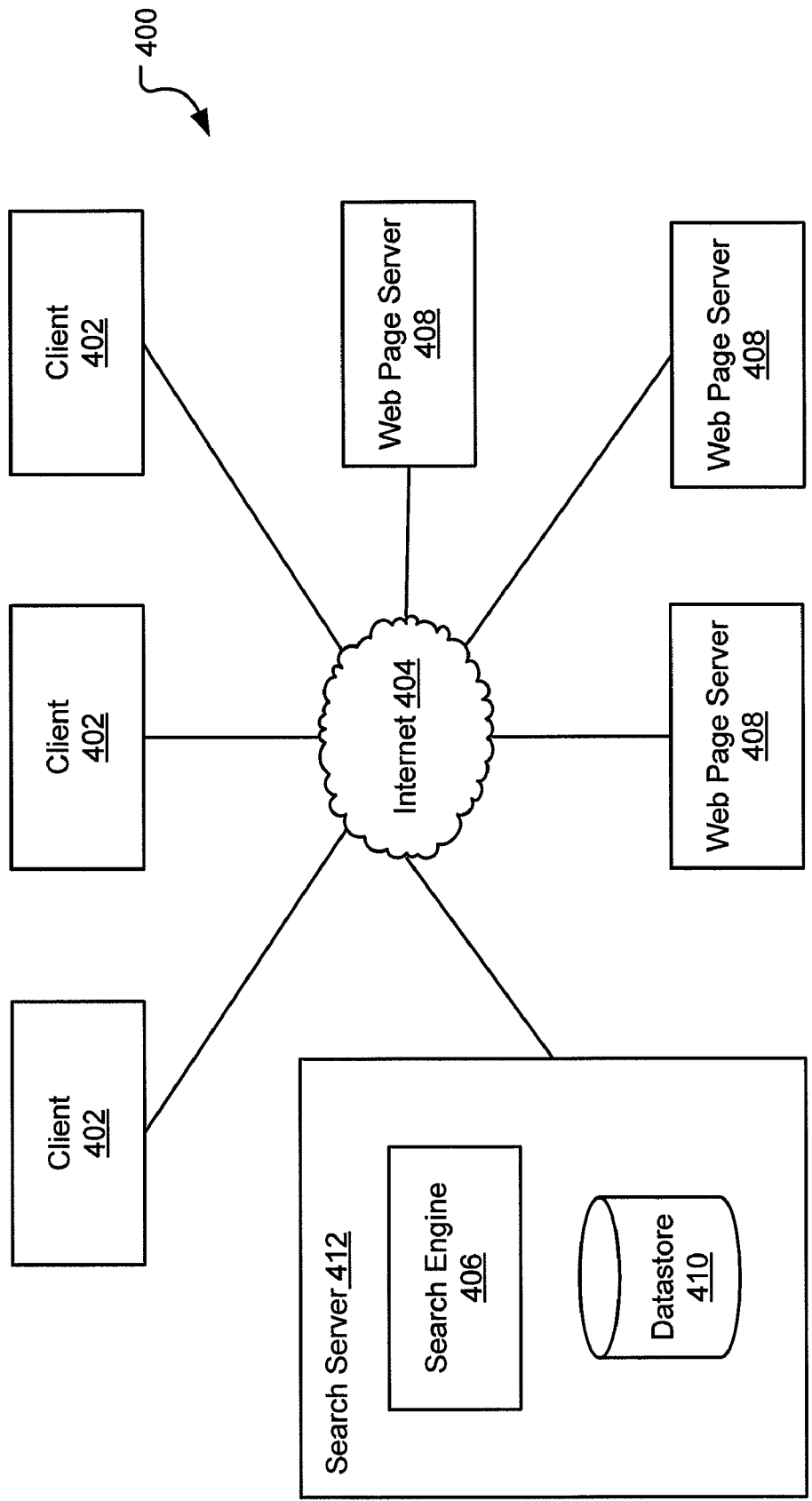
FIG. 4 illustrates an embodiment of a client-server computing architecture incorporating a search early warning system as described above.

FIG. 4 illustrates an embodiment of a client-server computing architecture incorporating a search early warning system as described above. In the architecture 400 shown, several (three are shown) client computing devices 402 (or, simply, clients 402) are connected to a network 404 such as the Internet, as shown. The clients 402 may be a personal computing device such as a personal computer (PC) or a handheld computing device such as a smart phone. A client 402 may utilize an operating system and a browser to interact over a network connection with other computing devices such as the search server 412 and web page servers 408. Client-server architectures and components are known in the art and any suitable computing device may be used as a client 402.

The architecture 400 includes a search server 412 that includes a search engine 406. The clients 402 may interact with the search engine 406 through a web page that is the GUI of the search engine 406. In the embodiment shown, the search engine 406, in response to search requests made by the clients 402, performs a search of the web pages on the web page servers 408 accessible via the network 404 for web pages matching the search criteria supplied by the requestor.

In addition to generating listings or other representations of search results and transmitting the same to the requesting client 402, the search engine 406 also searches each web page in the listing for embedded code, such as via the methods described above. Information about the embedded code is then included with the search results transmitted to the requester.

The search engine 406 is further adapted to interact with a database 410 containing a list of embedded code that is known to be malicious. The database 410 may also include a list of code that is known to be safe or that has been registered with the search engine 406 as safe. The database may be maintained on the search server 412 as shown or, alternatively, may be maintained at a remote location, such as by a security authority (not shown) that continuously updates the database 410 to include newly identified embedded code.

In an embodiment, the database 410 may also include a list of known web pages or content that contains embedded code. This list may be accessed, as described above, as part of the process of generating the search results for transmission to the requester. If an item, such as a web page, in the search results is identified in the database, then the item may be flagged with the appropriate information or icon. The database 410 may then include a list of all known web pages or items that have embedded code and may also include information for each entry in the list identifying the type(s) of embedded code and whether the web page is known to contain malicious software. As the search engine 406 and members of the community identify new web pages or provide new or updated information, the database 410 may be updated or revised to reflect the most recent information.

The database 410 may be stored on a mass storage device (not shown) that is connected to the search server 412 or alternatively may be considered part of the server 412. The mass storage device and its associated computer-readable media, provide non-volatile storage. Although the description of computer-readable media contained herein refers to a mass storage device, such as a hard disk or CD-ROM drive, it should be appreciated by those skilled in the art that computer-readable media can be any available media that can be accessed by the search server 412.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

It will be clear that the present invention is well adapted to attain the ends and advantages mentioned as well as those inherent therein. Those skilled in the art will recognize that the methods and systems of the present invention within this specification may be implemented in many manners and as such is not to be limited by the foregoing exemplified embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope of the present invention. For example, while embodiments have been discussed in terms of .HTML web pages, one skilled in the art will realize that any type of digital content may be searched using this technique, including web pages written in another language such as XML, music, artwork or movies.

Furthermore, regardless of how searches are performed and items listed in search results are determined to contain embedded code or potentially malicious code, embodiments of the present invention deliver search results to the user that identify the presence of embedded code or possibly malicious code in items listed in the search results. How such a presence is indicated to the user may differ depending on the way the search results are presented to the user.

Numerous other changes may be made which will readily suggest themselves to those skilled in the art and which are encompassed in the spirit of the invention disclosed and as defined in the appended claims.

What is claimed is:

1. A method comprising:
receiving, from a computing device and by a search engine executing on a computer, a search request;
identifying, by the search engine, search results in response to both the search request and user selected preferences related to embedded code, the search results comprising a listing of a plurality of web pages matching criteria contained in the search request;
scanning, by the search engine, each of the plurality of web pages for an embedded code identifier to identify one or more web pages in the plurality that contains embedded code, wherein the embedded code of a web page is code that is automatically executed when the web page is displayed;
comparing, by the search engine, the embedded code associated with the identified embedded code identifier with known embedded code, wherein for each of the one or more web pages containing the embedded code, the comparing comprises comparing the embedded code in the web page to a database of embedded code;
classifying, by the search engine, web pages in the search results based in part on information derived from the embedded code and from the comparing step, wherein if the embedded code is identified in the database as malicious, indicating in the search results that the web page containing the embedded code is potentially dangerous and that the web page contains one or more of a specified type of embedded code; and
transmitting, by the search engine, the classified search results in relation to the user selected preferences to the computing device.

2. The method of claim 1 wherein the scanning further comprises:
searching each of the one or more web pages for text that is associated with the embedded code identifier.

3. The method of claim 2 wherein the searching further comprises:
searching for the embedded code identifier selected from EMBED, APPLET, OBJECT, IFRAME and STYLE.

4. The method of claim 1 further comprising:
identifying the embedded code in at least one web page matching criteria contained in the search request.

5. The method of claim 4 wherein identifying embedded code further comprises:
retrieving an identifier associated with the embedded code.

6. The method of claim 5 wherein the identifier is a URL of the embedded code.

7. A system comprising:
a database;
a search engine in communication with the database and adapted to
receive, from a computing device, a search request;
identify search results in response to both the search request and user selected preferences related to embedded code, the search results comprising a listing of a plurality of web pages matching criteria contained in the search request;
scan each of the plurality of web pages for an embedded code identifier to identify one or more web pages in the plurality that contains embedded code, wherein the embedded code of a web page is code that is automatically executed when the web page is displayed;
compare the embedded code associated with the identified embedded code identifier with known embedded code stored in the database, the database identifying at least one embedded code as malicious;
classify web pages in the search results based in part on information derived from the embedded code and from the comparing step, wherein if the embedded code is identified in the database as malicious, indicating in the search results that the web page containing the embedded code is potentially dangerous and that the web page contains one or more of a specified type of embedded code; and
transmit the classified search results in relation to the user selected preferences to a computing device.

8. The system of claim 7, wherein the search engine is further adapted to indicate on the listing that a web page contains the embedded code based on the comparison.

9. The system of claim 8 wherein the search engine is further adapted to determine the type of the embedded code.

10. The system of claim 9 wherein the search engine indicates on the listing the type of the embedded code.

11. A graphical user interface displayed on a display of a computer, the graphical user interface comprising:
a listing of items, generated by a search engine, visibly displayed on the display of the computer and matching search criteria and user-selectable control elements provided by a search requester, the user-selectable control elements corresponding to embedded code of the items in the listing of items, wherein the embedded code of an item in the listing of items is code that is automatically executed when the item is displayed,
wherein the search engine scans each item in the listing of items for an embedded code identifier and compares the embedded code associated with the embedded code identifier with known embedded code stored in a database, the database identifying at least one embedded code as malicious, the comparison and the user-selectable control elements determining whether each of the items in the listing of items is visibly displayed, wherein if the embedded code is identified in the database as malicious, indicating in the search results that the item containing the embedded code is potentially dangerous and that the item contains one or more of a specified type of embedded code; and
associated with each item, an embedded code information area visibly displayed containing information describing the embedded code contained in the associated item.

12. The graphical user interface of claim 11 further comprising:
    a preferences area visibly displayed, the preferences area comprising at least one user-selectable control element controlling the display of the items in the listing based on embedded code contained in the associated items.

13. The graphical user interface of claim 11 wherein the information comprises one or more icons, each icon associated with a different type of embedded code.

14. The graphical user interface of claim 13 wherein at least one icon indicates that the embedded code is malicious based information known to the search engine.

15. A method comprising:
    receiving, from a computing device and by a search engine executing on a computer, a search request;
    identifying, by the search engine, content items that match criteria contained in the search request and user selected preferences related to embedded code;
    identifying, by the search engine, an embedded code identifier in one or more of the content items;
    comparing, by the search engine, the embedded code identified by the embedded code identifier in the one or more content items with known embedded code stored in a database, the database identifying at least one embedded code as malicious, wherein the embedded code of a content item is code that is automatically executed when the content item is displayed;
    classifying, by the search engine, the one or more content items based in part on information derived from the embedded code and from the comparing step, wherein if the embedded code is identified in the database as malicious, indicating in the one or more content items that the one or more content items containing the embedded code is potentially dangerous and that the one or more content items contain one or more of a specified type of embedded code;
    transmitting, by the search engine, the one or more content items in relation to the user selected preferences to the computing device.

16. The method of claim 15 further comprising:
    searching a network for content items that contain the embedded code; and
    for each content item on the network containing embedded code, storing in the database information identifying the content item as a content item containing the embedded code.

17. The method of claim 16 wherein the content items are web pages and searching further comprises:
    searching web pages on the network for text associated with the embedded code identifier; and
    storing in the database an identifier for each web page found that contains text associated with the embedded code identifier.

18. The method of claim 17 wherein searching further comprises:
    searching for an embedded code identifier selected from EMBED, APPLET, OBJECT, IFRAME and STYLE.

19. The method of claim 17 wherein the identifier is a URL of the web page.

20. The method of claim 16 further comprising:
    for each content item on the network containing the embedded code, storing in the database information identifying the embedded code contained in the content item.

21. A method comprising:
    receiving, from a computing device and by a search engine executing on a computer, a search request;
    identifying, by the search engine, at least one content item that matches criteria contained in the search request;
    identifying, by the search engine, an embedded code identifier in the one or more content items;
    comparing, by the search engine, the embedded code identified by the embedded code identifier in the one or more content items with known embedded code stored in a database, the embedded code of a content item being code that is automatically executed when the content item is displayed, and wherein the comparing further comprises comparing the at least one content item to the database to identify content items containing potentially malicious embedded code and, if the content item is identified in the database, indicating that the content item contains potentially malicious embedded code and that the content item contains one or more of a specified type of embedded code; and
    transmitting, by the search engine, a search result in response to the search request and user selected preferences related to embedded code, the search result identifying the at least one content item matching both the criteria contained in the search request and the user selected preferences, and the search result further comprising information identifying presence of potentially malicious embedded code in the at least one content item.

22. The method of claim 21 further comprising:
    determining if the at least one content item contains potentially malicious embedded code.

23. The method of claim 22 further comprising:
    searching a network for content items that contain potentially malicious embedded code; and
    storing in the database information identifying the content item as a content item containing potentially malicious embedded code.

24. The method of claim 23 wherein the content item is a web page and searching further comprises:
    searching web pages on the network for text associated with the embedded code identifier.

25. The method of claim 24 wherein searching further comprises:
    searching for the embedded code identifier selected from EMBED, APPLET, OBJECT, IFRAME and STYLE.

26. The method of claim 23 wherein the information comprises a URL of the content item.

27. The method of claim 23 further comprising:
    storing in the database information identifying the potentially malicious embedded code contained in the content item.

\* \* \* \* \*